March 24, 1953  F. G. BOUCHER  2,632,795
RETRACTABLE ELECTRODE FOR WELL CASING MEASUREMENTS
Filed June 1, 1951  2 SHEETS—SHEET 1

Frank G. Boucher Inventor
By W. O. J. Heilman Attorney

Frank G. Boucher Inventor
By W. V. T Heilman Attorney

Patented Mar. 24, 1953

2,632,795

UNITED STATES PATENT OFFICE 2,632,795

RETRACTABLE ELECTRODE FOR WELL CASING MEASUREMENTS

Frank G. Boucher, Tulsa, Okla., assignor to Standard Oil Development Company, a corporation of Delaware Application June 1, 1951, Serial No. 229,400

4 Claims. (Cl. 175—183)

The present invention relates to apparatus for making measurements in oil wells. More particularly, it concerns a device for retracting electrodes employed in making electrical measurements in cased bore holes.

It is often desired to make spot electrical measurements of one kind or another in a cased bore hole. For example, in attempting to apply cathodic protection to well casing, it is necessary to make potential drop measurements at different points along the length of the casing. To ensure good contact with the casing, the electrodes must be provided with very sharp edges, and considerable pressure must be applied to them so that they cut through the film of dirt and corrosion that accumulates on the casing wall. If the electrodes are held against the casing while the probe is being moved over several thousand feet, as is now done, the sharp edges become dulled and often will not cut through the scale sufficiently to make good contact.

It is an object of this invention to provide a simple and yet effective means for holding casing measuring electrodes in a retracted position while they are being lowered into or raised out of the well casing or are being moved from one depth to another in the casing, and for setting the electrodes against the casing at the desired depth, thereby preserving the sharp edges of the electrodes until they are actually needed for the desired purpose. Another object of the invention is to provide means for ensuring that the electrodes, when extended to engage the walls of the casing, will cut through the scale on the casing surfaces efficiently once they have been set in the desired position.

The above and other objects of the invention will be fully apparent from the ensuing description when read in conjunction with the accompanying drawing in which.

Figure 1:
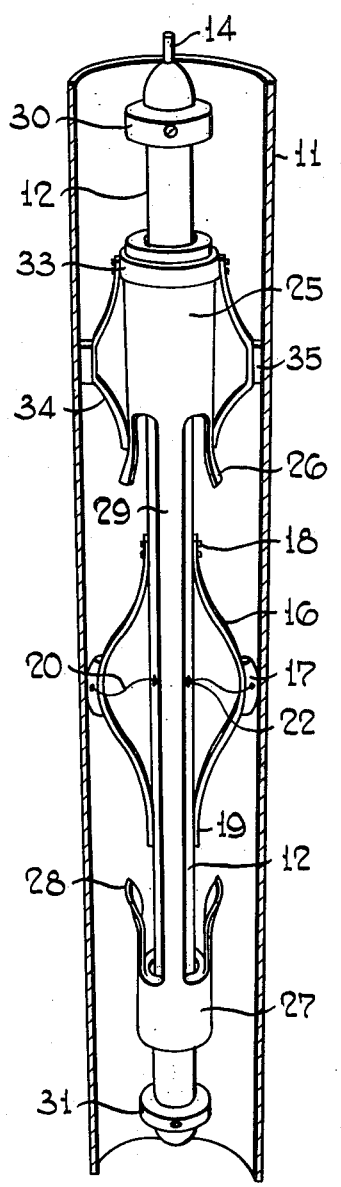
Figure 1 is an elevational perspective view of the apparatus in position in a section of well casing.

Referring now particularly to Figure 1, it will be seen that the device is mounted on a central vertical rod 12 which is supported on a cable 14, carrying one or more conductors as explained below. Attached to rod 12 are two or more bowed springs 16 fastened at one end by fastening means 18. Preferably three such springs are employed, spaced radially about rod 12, although only two are shown, to simplify the drawing. Fastened to the outer end of the bow of each of the springs 16 is a knife-edged electrode 17, springs 16 being so formed that when not retracted they will expand outwardly and press the electrodes 17 against the wall of the casing 11. It will be noted that the lower end 19 of each of the springs 16 presses firmly against rod 12, but is not attached to the rod. Suitable conductors 20 are connected to each of the electrodes 17 and pass through openings 22 in rod 12 and thence into cable 14.

Slidably mounted on rod 12 above springs 16 is a sleeve 25 having downwardly directed and outwardly flared projections 26. Similarly mounted below spring 16 is another sleeve 27 having upwardly extending and outwardly flared projections 28. Sleeves 25 and 27 are connected by one or more elongated strips 29 so that the two sleeves will move together on rod 12. The extent of movement of the sleeves on rod 12 is limited by stops or collars 30 and 31. Attached to sleeve 25 is a ring or collar 33 to which in turn are attached two or more centering springs 34 provided with guide shoes 35 that engage the walls of casing 11. A similar centering spring device may be attached to sleeve 27 if desired.

Figure 2:
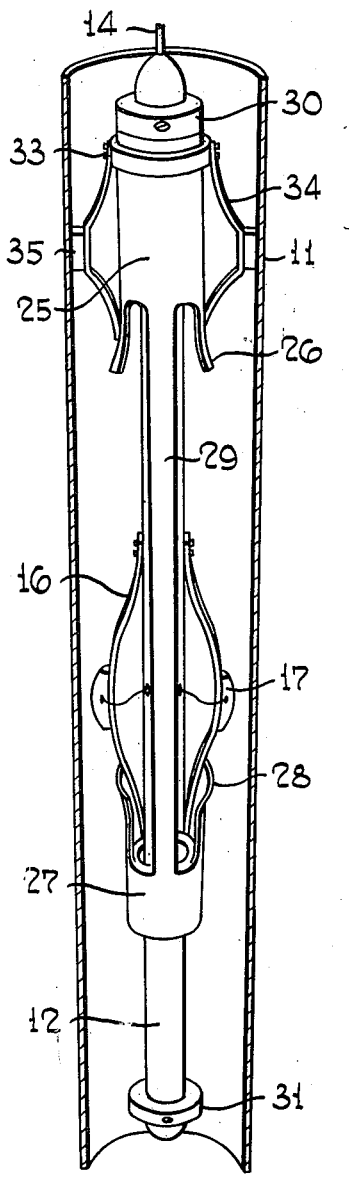
Figure 2 is a similar view showing the electrodes in a retracted position as the device is lowered through the casing.
Figure 3:
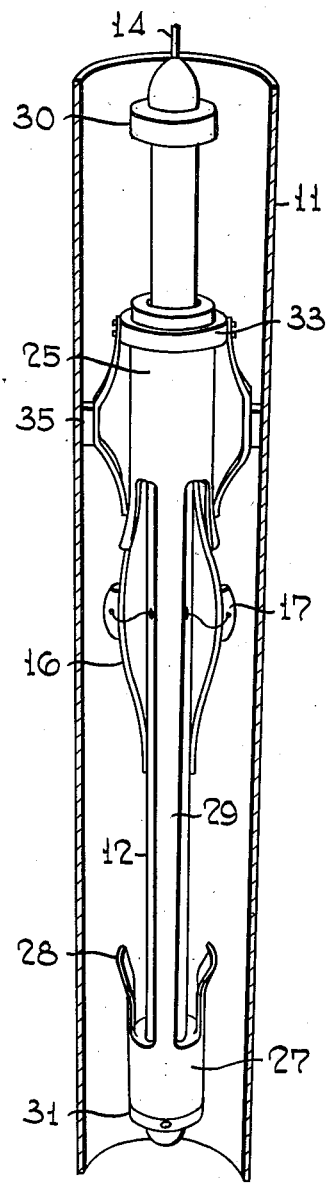
Figure 3 is a related view with the electrodes retracted as the device is raised in the casing.

As the device shown in Figure 1 is lowered through the casing, the centering springs 34 will press shoes 35 against the casing wall with sufficient force so that the weight of rod 12 will cause it to move downwardly with respect to sleeves 25 and 27, thus bringing projections 28 into engagement with the lower ends of springs 16. This causes the electrodes to be retracted as shown in Figure 2. Thus the sharp edges of the electrodes 17 will not be worn down while the device is being lowered through the casing. When the proper depth is reached the cable is raised a short distance, for example, one to three feet, which will cause rod 12 to move upwardly with respect to sleeves 25 and 27, thus releasing the electrodes to the position shown in Figure 1. If cable 14 is raised further, rod 12 will continue to move upwardly with respect to the sleeves 25 and 27 until projections 26 engage the upper ends of springs 16 and retract the electrodes as shown in Figure 3. Thus the device may be raised through the casing with the electrodes out of contact with the casing.

It is readily apparent that when the desired level is reached, the electrodes may be released, as described above and then moved up and down a small amount by raising and lowering cable 14 a short distance so that the sharp edges of the electrodes will cut through any scale that may be present on the inside walls of casing 11. The exact distance that cable 14 must be raised and lowered to accomplish this will of course depend upon the spacing between the sleeves 25 and 27.

It can thus be seen that the electrodes can be moved up or down the casing without undue wear and can be made to establish good contact with the casing by reversing the direction of motion of the supporting cable and moving the same up and down a short distance.

Although in some instances one assembly such as that shown in Figures 1, 2 and 3 will suffice for making measurements or for introducing current into the casing, it is frequently necessary or desirable to conduct measurements or to introduce currents while employing two or more electrode groups spaced vertically from each other at distances of say 25, 100 or 200 feet. It is a simple matter to extend cable 14 below rod 12 the desired distance and fasten to the cable a second assembly of the type shown in Figure 1. If sleeves 25 and 27 are sufficiently spaced from each other there will be no difficulty in manipulating the plurality of devices so arranged on the cable that all of the electrodes will be retracted when desired and will likewise be extended when desired.

Figure 4:
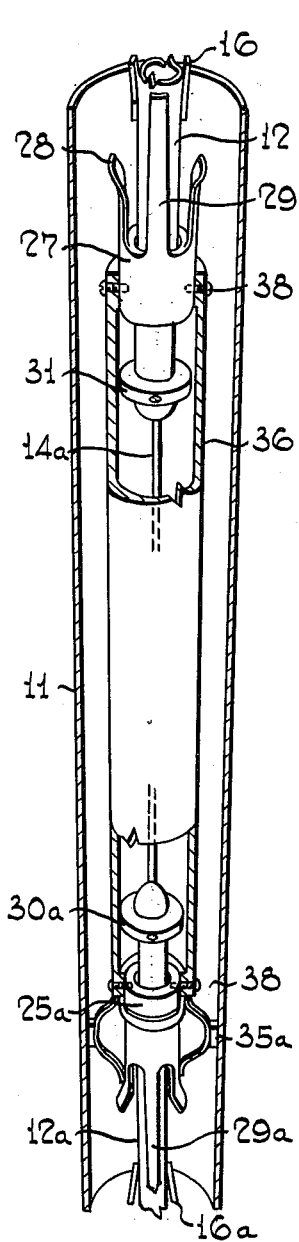
Figure 4 is a modification of the device in which a plurality of vertically spaced electrodes are employed.
Figure 5:
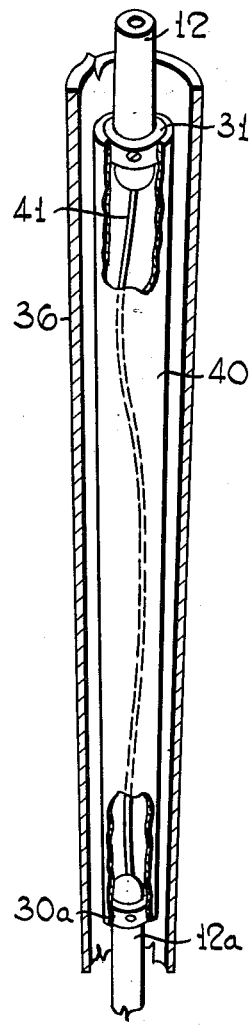
Figure 5 is a fragmentary view showing a further refinement in the arrangement of Figure 4.

If more positive simultaneous action of the devices is desired it is practical, at least for a short space of say 25 to 50 feet, to couple two of the sleeve assemblies together in the manner shown in Fig. 4, employing a length of tubing 36 or equivalent means fastened to sleeves 27 and 25a with screws or bolts 38, the lower rod 12a being supported on a suitable length of cable 14a. Even more positive simultaneous action may be provided by likewise mechanically tying the upper and lower rods 12 and 12a by a suitable length of pipe or tubing 49 which may be conveniently fastened to stops 31 and 30a as shown in Fig. 5. Electrical communication is established with the lower electrodes through conductor 41.

It is to be understood that the specific embodiments of the invention described above are presented by way of example only, and that the invention is not limited thereto. The scope of the invention is defined by the following claims.

What is claimed is:

1. A retractable electrode assembly for measuring electrical properties in casing in a bore hole comprising an elongated cylindrical body adapted to be lowered into said casing, at least one bowed spring element compressibly fastened to said body, an electrode fastened to the outer portion of the bow of said spring element, a pair of sleeve members slidably mounted on said body above and below said bowed spring element, spring centering means fastened to at least one of said sleeve members and slidably engageable with said casing, means tying said sleeve members in fixed relation, stop elements on said body adjacent said sleeve members to limit their slidable movement along said body, and means on each of said sleeve members engageable with said bowed spring element to compress said bowed spring inwardly upon slidable movement of said sleeve members relative to said body.

2. Assembly according to claim 1 in which said means on said sleeve members engageable with said bowed spring element comprises generally vertically directed outwardly flared projections on said sleeves.

3. Electrode assembly according to claim 1 including a second elongated cylindrical body, a flexible cable fastened to said first cylindrical body and supporting said second cylindrical body, a bowed spring element, an electrode, a pair of sleeve members, tying means for said sleeve members, and spring engaging means on said sleeve members, all arranged on said second cylindrical body in the manner defined by claim 1 and a rigid member of selected length tying the lower sleeve member on said first cylindrical body to the upper sleeve member on said second cylindrical body.

4. Electrode assembly according to claim 1 including a second elongated cylindrical body, rigid means of selected length supporting said second cylindrical body below said first cylindrical body, a bowed spring element, an electrode, a pair of sleeve members, tying means for said sleeve members, and spring engaging means on said sleeve members, all arranged on said second cylindrical body in the manner defined by claim 1 and a rigid member of selected length tying the lower sleeve member on said first cylindrical body to the upper sleeve member on said second cylindrical body.

FRANK G. BOUCHER.

REFERENCES CITED

The following references are of record in the file of this patent:

UNITED STATES PATENTS

| Number | Name | Date |
| --- | --- | --- |
| 1,895,643 | Putnam | Jan. 31, 1933 |